April 9, 1968   J. H. DE FREES   3,377,049
GATE VALVE
Filed Oct. 24, 1965   2 Sheets-Sheet 2

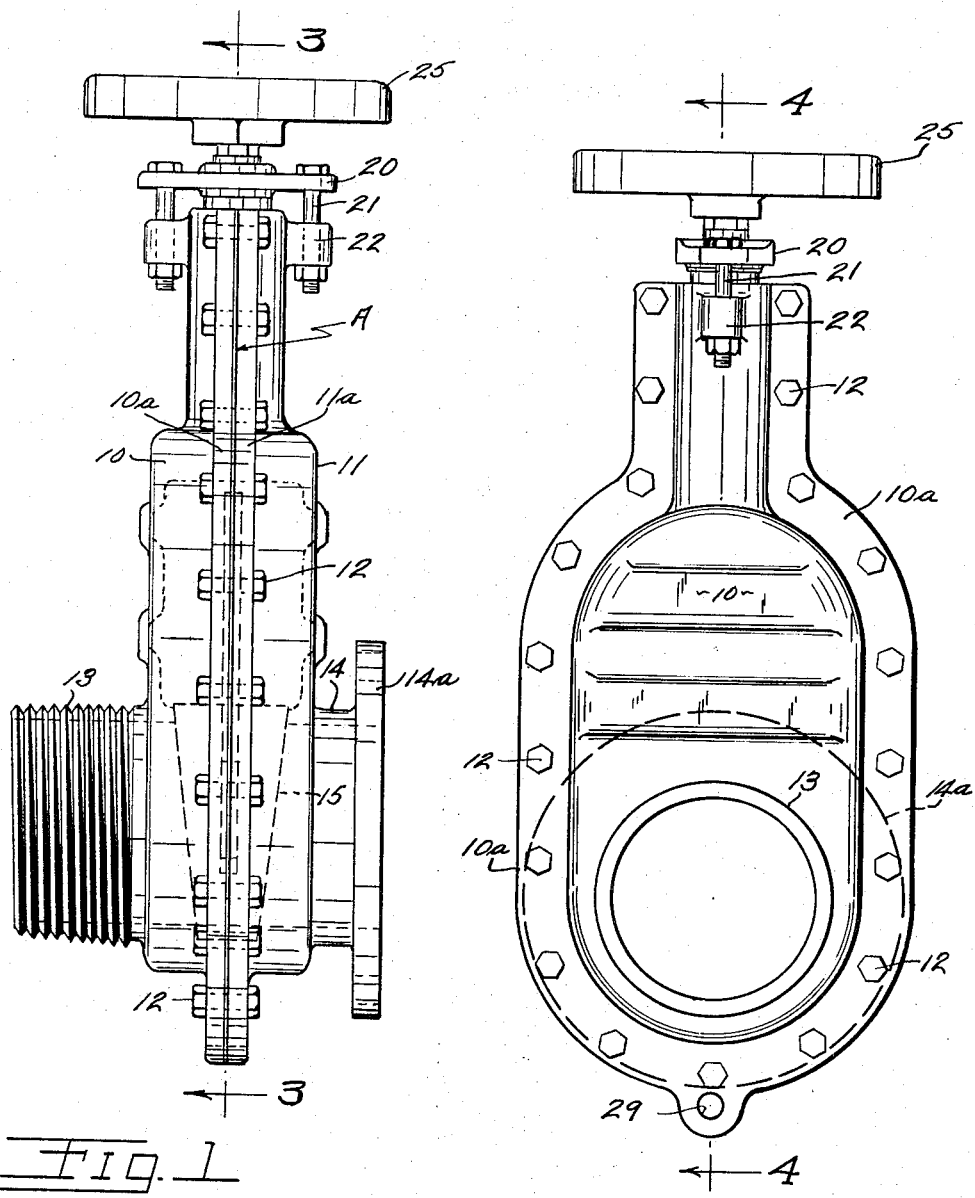

INVENTOR
JOSEPH H. DE FREES
BY
Baldwin, Doran & Egan
ATTORNEYS

United States Patent Office 3,377,049
Patented Apr. 9, 1968

3,377,049
GATE VALVE
Joseph H. De Frees, 414 Liberty St.,
Warren, Pa. 16365
Filed Oct. 24, 1965, Ser. No. 504,750
3 Claims. (Cl. 251—329)

This invention relates to gate valves, and more particularly to a gate valve assembly characterized by novel and improved structural features.

An object of the invention is to provide a gate valve assembly of novel design permitting reduced production costs.

A further object of the invention is to provide a gate valve structure of the character defined in the last preceding paragraph which is especially suited for ready assembly and disassembly, for example for cleaning or possible repair.

Other objects and advantages will be apparent from a study of the following specification, in conjunction with the accompanying drawings, in which:

FIG. 1 is a side elevational view of a gate valve assembly embodying my invention;

FIG. 2 is a vertical elevational view of the valve as seen from the left side of FIG. 1.

FIG. 4 is a vertical sectional view taken on the line 4—4 of FIG. 2; while

Figure 3:
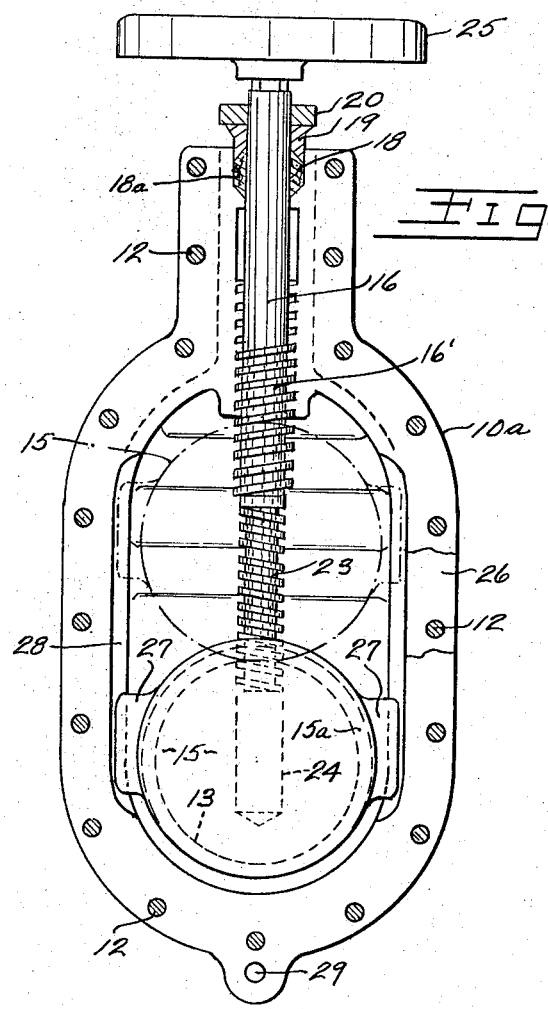
FIG. 3 is a vertical sectional view taken on the line 3—3 of FIG. 1.

The valve assembly comprises two complementary body portions 10 and 11 having mating peripheral flanges 10a and 11a each of which has a spaced set of bolt holes aligned to receive assembly bolts 12.

Integral with the body portions 10 and 11 are resective ports defined by necks 13 and 14 one of which may be an inlet passage and the other a discharge passage for fluid flow controlled by the gate valve. The purpose of the gate valve of course is to prevent or permit the fluid flow from one neck to the other. In the embodiment shown neck 13 has a peripheral male thread and neck 14 has a flange 14a for suitable connection to a mating flange (not shown) on a conduit, header, or the like. Obviously, both parts could be flanged, or both threaded.

Figure 4:
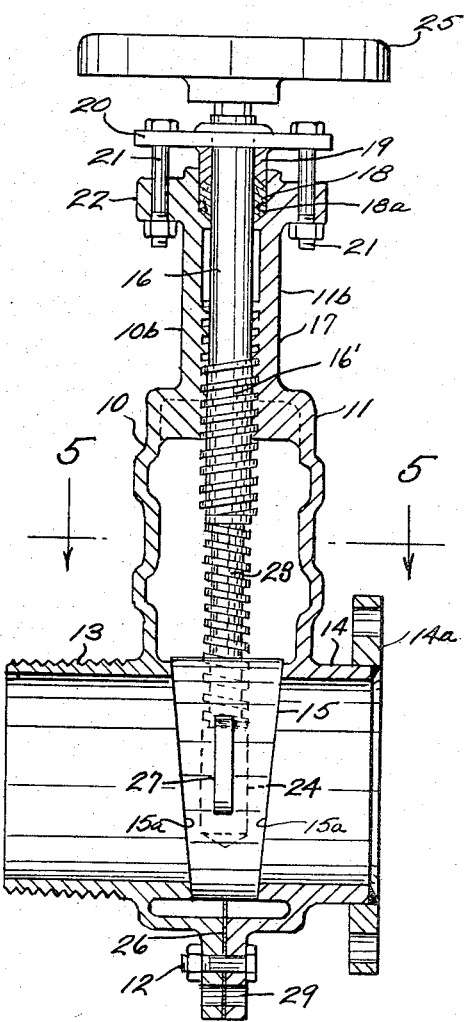

As best shown in FIG. 4, the inner ends of the necks 13 and 14 are formed to lie in downwardly convergent planes for functional cooperation as valve seats 15a, with a downwardly convergent wedge-shaped valve head 15 which is raised or lowered by rotation of a valve stem 16. The valve stem is threaded at 16' to engage a threaded aperture in the complementary valve body halves 10b and 11b which, when assembled as shown in the drawings, constitute a bonnet 17, FIG. 4. The valve stem has an annular packing 18 which is compressed in stuffing box 18a by a gland follower 19 retained in tight engagement with the packing by means of a cross bar 20. Note that stuffing box 18a is formed by two semi-annular recesses which are cast in the valve body halves and which mate when said halves are bolted together. The cross bar can be pulled downwardly by two adjusting bolts 21 which pass through the bar 20 and through ears 22 cast integrally with halves 10b and 11b.

At its lower end stem 16 engages, by means of threads 23, in a threaded aperture 24 in the gate valve head 15. The threads 17 and 23 are reversed in relation to each other so that when stem 16 is rotated by hand wheel 25 the opening or closing movement of gate head 15 is expedited.

Figure 5:
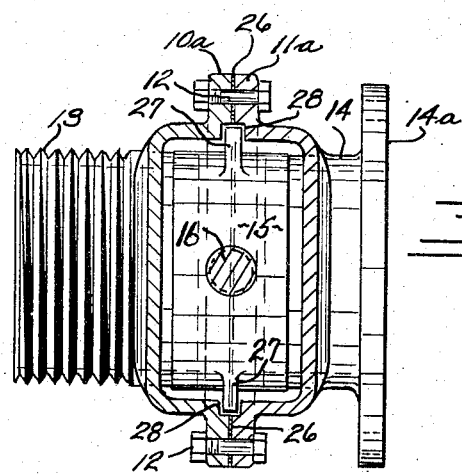
FIG. 5 is a horizontal sectional view taken on the line 5—5 of FIG. 4.

A fitted gasket 26 (FIGS. 4 and 5) is gripped between flanges 10a and 11a for leakproof sealing when bolts 12 are drawn up.

Assembly of the valve is extremely simple. One of the body halves, for example part 11, is laid down with its internal concave side upwardly. The gasket 26 is disposed on flange 11a. The valve stem and head are laid in the position shown in FIG. 4 and body half 10 is placed on top with the matched bolt holes in alignment. The bolts 12 are inserted and their nuts are drawn up. The packing 18 and gland follower 19 are dropped on the top end of the valve stem 16, and tightened by means of cross bar 20 and bolts 21.

The valve head is provided, in the plane of parting A of the body halves, with a pair of opposed lugs 27, the outer edges of which are slidable vertically in a pair of grooves 28 cast in the mating edge faces of the two body halves. This construction guides the opening and closing movement of the valve head 15. The hole 29 at the lowermost part of the peripheral mating flange can be used for a chain attached to a cap for protecting the thread on neck 13.

The simplicity of the housing design permits it to be readily produced by a die casting operation, which means that the production cost can be substantially reduced. The use of mating halves facilitates machining tapered seats 15a, cleaning, and repairing. Note that seats 15a open toward the plane of parting A of the body halves so they are readily accessible for machining.

From a study of the two mated members forming the valve body just described, it will be apparent that each member, consisting of the dished body, the cylindrical portions constituting the inlet or outlet port, and the upwardly projecting bonnet half, can be integrally cast in a gravity-casting permanent metal mold, or in a pressure die-casting die because of the absence of reentrant curves or undercut recesses. The port passage walls are coaxial, and normal to the plane of the connecting flanges and the complete valve body is practically ready for assembly as its two components are withdrawn from their molds or dies. It may need a skin cut or a slight grinding operation on the valve seats. The flange 14a, if needed, may be added by welding, if it is desired to simplify the casting.

What is claimed is:

1. A gate valve housing comprising two complementary generally dished halves having respective peripheral edge flanges unitable in a parting plane to provide respective lower body portions having within them, when assembled, a valve chamber, one said body portion having an inlet port aperture therein defined by first and second tubular stub conduits, the first said conduit extending into said chamber and the second said conduit extending outside said chamber, the other said body portion having an outlet port aperture defined by respective third and fourth stub conduits, the third said conduit extending within said chamber and the fourth said conduit extending outside said chamber, the inner ends of the first and third conduits being spaced apart, said inner ends being formed to respective planar contours and being downwardly convergent to provide respective valve seats for a downwardly convergent wedge-shaped valve head intended for manipulation by a valve stem connected to said head for moving said head to a closed or open position, said halves, when assembled, providing a bonnet extending upwardly from said body portions, each bonnet half being integral with its associated body portion, each bonnet half having matching semi-cylindrical vertically extending bores centrally located whereby, when the dished halves are assembled, the bonnet halves provide a bore through which a valve stem can extend, each bonnet half being cast, in line with said bore, with one half of a thread to receive a threaded portion of a valve stem when said halves are assembled, and each dished half being formed as a single integral casting without re-entrant bends or undercut recesses whereby said half can be withdrawn from its die without the use of multipart molds, dies, or cores.

2. A gate valve housing as defined in claim 1, wherein mating semi-annular recesses are provided near the top of said bonnet halves opening into said body, whereby to provide a packing gland receiving box when said dished halves are bolted together.

3. A gate valve housing as defined in claim 2, wherein an ear is cast on each bonnet half near the top and laterally outside its associated semi-annular recess, whereby to provide means to receive bolts for retaining a packing gland follower tightly against packing in said box.

References Cited

UNITED STATES PATENTS

| 12,007 | 11/1854 | Tracy | 251—327 |
| 1,411,608 | 4/1922 | Dawson | 251—327 X |
| 3,052,963 | 9/1962 | Williams | 29—157.1 |
| 3,198,484 | 8/1965 | Martindale | 251—329 |
| 3,279,747 | 10/1966 | Grove | 251—329 |

FOREIGN PATENTS 996,298    4/1951    France.

M. CARY NELSON, *Primary Examiner.*

R. C. MILLER, *Assistant Examiner.*